Jan. 7, 1936. J. H. DE BOER ET AL 2,027,025
PHOTO ELECTRIC DEVICE
Filed Nov. 20, 1933
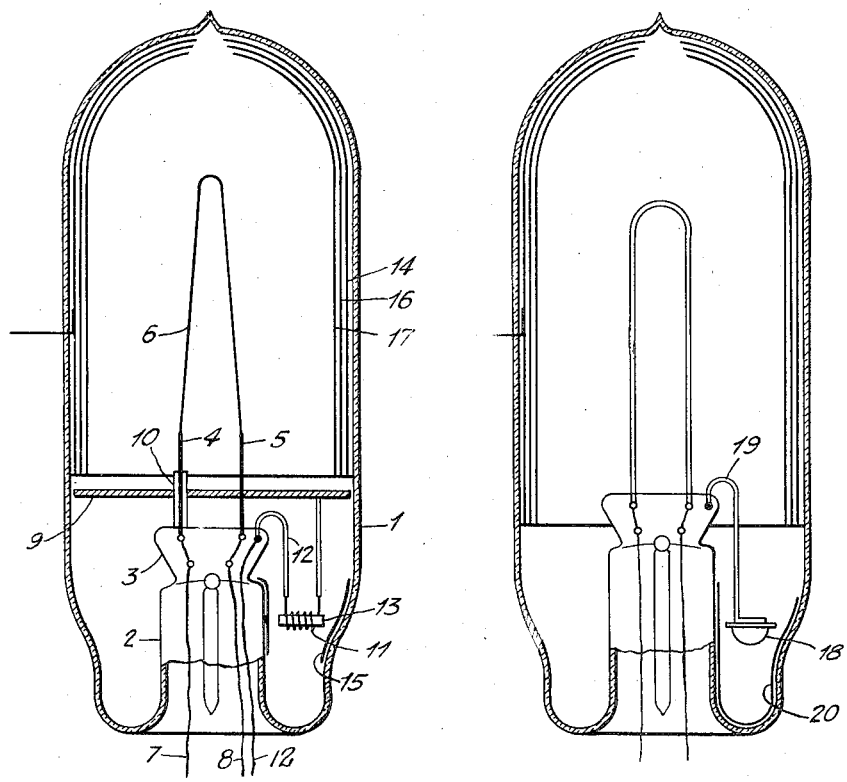
INVENTOR
JAN HENDRICK DE BOER
MARTIN CORNELIS TEVES
BY
ATTORNEY Patented Jan. 7, 1936

2,027,025

UNITED STATES PATENT OFFICE 2,027,025

PHOTO-ELECTRIC DEVICE

Jan Hendrik de Boer and Marten Cornelis Teves, Eindhoven, Netherlands, assignors to Radio Corporation of America, a corporation of Delaware Application November 20, 1933, Serial No. 698,788
In Germany December 31, 1932

2 Claims. (Cl. 250—27.5)

This invention relates to a photo-electric device, the photo-electric electrode of which is made partly or wholly of alkali-metal. Latterly the sensitiveness of such devices has been substantially increased by various measures. For this purpose it has been proposed among other things to apply the photo-electrically active metal to the layer of a chemical compound consisting, for example, of an oxide. Advantageously this layer may be mixed with the metal particles that may partially consist of photo-electrically active metal.

Good results have been obtained with a photo-electric electrode consisting of a metal layer which is superficially oxidized, then coated with photo-electrically active metal and subjected to such a treatment that the metal oxide formed is reduced by the photo-electrically active metal and that a mixture of the oxide of the photo-electrically active metal, of particles of the photo-electrically active metal itself and of particles of the metal oxidized and reduced again is produced. This mixed coating has in addition a thin layer of the photo-electrically active metal adsorbed to it. If the metal substratum is, for example, of silver and the photo-electrically active metal of caesium, the intermediate layer formed consists of a mixture of silver particles, caesium particles and caesium oxide particles; a thin caesium film being absorbed by this layer.

It is common to increase the sensitiveness by eliminating the excess of photo-electrically active substance. Various processes have been suggested for this purpose. One of them consists in vaporizing the excess of photo-electrically active metal out of the device by heating the device whilst the latter is in communication with a vacuum pump. It is also common to introduce a quantity of carbon into the device in order that the excess be adsorbed by carbon.

In addition, it is common to bring about a chemical reaction of the excess of photo-electrically active metal with a compound say lead oxide, introduced into the device and adapted to be introduced into the device in a pure state or to form a constituent ingredient of the device wall. Thus, for example, the base of the device was made of lead glass which is caused to react with the excess of photo-electrically active metal and combines therewith. It has also been suggested to introduce into the device in addition to the photo-electric electrode a metal, particularly tin or lead, which is adapted to form an alloy with the excess of photo-electrically active substance.

Now, it was found in manufacturing photo-electric devices that the sensitiveness of the finished devices is often substantially lower than the sensitiveness measured during the manufacture. It was found, in addition, that often the devices have large relative disparities.

As a result of exhaustive experiments it was determined that these disadvantages are to be imputed to small quantities of gas evolved in the device. During the sealing-off of the devices as during the formation of the photo-electric electrode and the elimination of the excess of photo-electrically active metal gases are liberated. Also the formation of the photo-electric electrode brings the photo-electrically active metal, which as a rule is caesium or potassium into contact with uncovered glass portions of the device. In the presence of the said metals practically any glass evolves gases in the presence of the heat required for the formation of the photo-electric electrode. Thus, for example, upon heating of substantially any glass with caesium to about 75° C. a fairly large amount of gas is evolved.

When carbon is used in the device there is the disadvantage that this substance practically cannot be freed from all occluded gases and that the gases still present in the carbon are expelled from the carbon during the adsorption of the photo-electrically active metal. Also in the case of alkali-metals acting on lead glass comparatively large quantities of gas are evolved. In contradistinction to the process indicated no gas is evolved when the excess of photo-electrically active metal is eliminated by means of tin and lead.

Researches have revealed that the gases evolved consist in the majority of cases of hydrogen. It has been found that adsorbed alkaline earth metal coatings are just highly sensitive to hydrogen so that the said gases exercise an unfavorable influence on the sensitiveness of the device and also give rise to large relative divergencies in the devices.

According to this invention the difficulty referred to hereinbefore is obviated by introducing into the device in addition to the photo-electric electrode a quantity of alkaline earth metal.

These metals combine with the gases evolved so that the latter cannot exercise their unfavorable action. It has been found that in contradistinction to magnesium which has been proposed for getter purposes in photo-tube, barium, strontium and calcium produce highly favorable results. Experiments have shown that hydrogen which, as is set out hereinbefore, constitutes a large part of the gases evolved is practically not taken up by magnesium but to a high extent by barium, strontium and calcium.

A practical construction is obtained by mounting a screen in the device so as to divide the latter into two parts, one of which contains the photo-electric electrode, the alkaline earth metal being mounted in the other part. In this case the screen may consist wholly or partly of a substance adapted to combine with the excess of alkali-metal.

In order that the invention may be clearly understood and readily carried into effect, one embodiment thereof will now be more fully described by way of example with reference to the accompanying drawing.

The photo-electric device illustrated in Figure 1 has a cylindrical glass wall 1 to which a funnel 2 with its pinch 3 is sealed. This pinch has sealed in it two pole-wires 4 and 5 to which is secured the anode 6 which is constituted by a metal wire, for example a tungsten wire, bent in the shape of a hair-pin. The pole-wires 4 and 5 are connected to leading-in wires 7 and 8. The lead 5 has secured to it a metal screen 9. The lead 4 is passed through this screen by means of a small insulating tube 10.

Arranged laterally of the funnel is an incandescent coil 11 secured both to the screen 9 and to a leading-in wire 12. The anode 6 is connected to the screen and to the funnel before the latter is sealed to the glass bulb, a small piece of calcium 13 being mounted within the coil 11 and a quantity of silver being supplied to the anode 6.

After the funnel is sealed to the glass bulb, the device is exhausted and the silver applied to the anode is then vaporized. This silver becomes deposited on the wall of the device and there it constitutes the layer 14, a portion of the device wall that subsequently will constitute the window of the device being protected from silver deposit by means of a screen not shown.

After the application of the silver layer 14 it is coated with a layer of silver oxide, a small amount of oxygen being admitted into the device and an electric discharge between the silver layer 14 that serves as the cathode and the anode 6 being struck for this purpose. After the excess of oxygen is eliminated the calcium 13 is heated to the extent of being freed from occluded gases and a small amount of calcium is vaporized to clean up the vacuum of the tube. The calcium vaporized becomes deposited in the form of a film 15 on the lower part of the device wall. A quantity of caesium is then introduced into the device, whereupon the device is sealed off. The calcium is then heated again so that a larger quantity of calcium is vaporized and becomes deposited on the wall. The device is then heated and thus part of the caesium introduced reacts with the silver oxide so that a mixture of caesium oxide particles and silver particles is formed. As a result of the heating of the device also caesium particles penetrate into this mixture so that a layer 16 consisting of a mixture of caesium oxide particles, silver particles and caesium particles is produced and in addition a thin, preferably monomolecular caesium layer 17 is adsorbed by the said mixed layer.

During this heating of the device, part of the caesium comes into contact with the glass of the device, so that gases, particularly hydrogen, are evolved. Such gases were also liberated during the sealing off of the device. The said gases are taken up by the calcium of the layer 15 so that the film of caesium 17 is protected from these gases. As the calcium exercises its action of taking up gas to the greatest extent during the vaporization, if necessary, a small amount of calcium may finally be vaporized as before. The calcium mirror 15 has, however, proved to be so active, particularly during the heating operation to which the tube is subjected, that the latter vaporization is generally unnecessary.

During the heating of the device not only the gases are taken up but the excess of caesium is rendered harmless by the tin with which the screen 9 is coated. This metal constitutes an alloy with the excess of caesium.

The screen 9 also serves for shielding the pinch 3 against the metals vaporized in the device.

Obviously, the calcium may be introduced into the device in a different manner. Thus, for example, a mixture of a reducible calcium compound, say calcium oxide, with a reducing agent, say zirconium or thorium, may initially be used. Also the tin may be liberated in the device in a similar manner, for example, from a mixture of tin oxide and zirconium. A simplification may be obtained by producing calcium and tin from a single compound, for example from calcium stannate.

The device shown in Fig. 2 contains a capsule 18 carried by a wire 19 and containing a mixture or an alloy of calcium and tin. The upper side of the capsule is constructed to constitute a screen. This capsule replaces the incandescible coil 11 of the device of Figure 1. When this capsule is heated by means of induced currents the calcium and the tin are volatilized and become deposited in the form of a layer 20 on the wall of the device. Both the gases and the excess of caesium can be taken up by this layer.

If the excess of caesium is eliminated not by means of a metal such as tin which is adapted to form an alloy with the caesium but by means of carbon which may be mounted near the funnel, the alkaline earth metal is volatilized during the adsorption of the caesium by the carbon or prior thereto. The gases evolved during this adsorption are readily taken up by the alkaline earth metal similarly to the gases evolved during the sealing off and during the formation of the cathode. The same may occur when the base of the glass bulb is made of lead glass and the excess of caesium is taken up by this lead glass.

Again, in this case the alkaline earth metal will preferably be volatilized before the reaction between the lead glass and the caesium is brought about.

Having thus described our invention, what we claim is:

1. A photo-electric device comprising an evacuated envelope, a partition in said envelope, an anode and an alkali metal cathode within said envelope at one side of said partition, and an alkaline earth metal and means for vaporizing said alkaline earth metal on the other side of said partition.

2. A photo-electric device comprising an evacuated envelope, a partition in said envelope, an anode and an alkali metal cathode within said envelope at one side of said partition, and an alkaline earth metal and means for vaporizing said alkaline earth metal on the other side of said partition, the said partition separating the said compartments, whereby the said alkaline earth metal in the second compartment is enabled to absorb the excess of alkali metal and of gases from the first compartment.

JAN HENDRIK DE BOER.
MARTEN CORNELIS TEVES.